United States Patent
Barker et al.

(10) Patent No.: US 8,499,908 B2
(45) Date of Patent: Aug. 6, 2013

(54) NON-NEWTONIAN FLUID (NNF) FILLED CABLE AND METHOD

(75) Inventors: Delmar L. Barker, Tucson, AZ (US);
Michael J. Broyles, Tucson, AZ (US);
Darrick M. Buban, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 201 days.

(21) Appl. No.: 13/091,840

(22) Filed: Apr. 21, 2011

(65) Prior Publication Data
US 2012/0267205 A1    Oct. 25, 2012

(51) Int. Cl.
*F16F 11/00*    (2006.01)
(52) U.S. Cl.
USPC ........................... 188/381; 188/267.2
(58) Field of Classification Search
USPC ....... 188/267, 267.1, 267.2, 381; 267/140.14, 267/140.15; 174/42
See application file for complete search history.

(56) References Cited

U.S. PATENT DOCUMENTS

| | | | | |
|---|---|---|---|---|
| 3,895,595 A * | 7/1975 | Kelly et al. | ............... | 114/243 |
| 4,868,967 A * | 9/1989 | Holt et al. | ............... | 29/450 |
| 5,070,597 A * | 12/1991 | Holt et al. | ............... | 29/887 |
| 6,029,783 A * | 2/2000 | Wirthlin | ............... | 188/267.1 |
| 6,435,323 B2 * | 8/2002 | Phelan et al. | ............... | 188/267.1 |
| 7,422,709 B2 * | 9/2008 | Gernon | ............... | 188/267.2 |
| 2005/0087408 A1 * | 4/2005 | Namuduri et al. | ............... | 188/267.1 |
| 2006/0213739 A1 * | 9/2006 | Shin-Ching | ............... | 188/267.1 |
| 2007/0278057 A1 * | 12/2007 | Wereley et al. | ............... | 188/267.1 |

FOREIGN PATENT DOCUMENTS

KR    2010076140 A  *  7/2010

OTHER PUBLICATIONS

Norman J. Wagner et al., "Shear Thickening in Colloidal Dispersions," 2009 American Institute of Physics, Oct. 2009, Physics Today, pp. 27-32.

* cited by examiner

*Primary Examiner* — Thomas J Williams
(74) *Attorney, Agent, or Firm* — Eric A. Gifford (57) ABSTRACT

A composite cable and method provides for control of the cable, and particularly its vibration modes, in response to a wide range of resonant and non-resonant energy input. The cable comprises a non-Newtonian fluid (NNF) in a cavity of a flexible tube. The NNF is characterized by viscosity that varies with shear stress. A load applies shear stress to the NNF changing its viscosity to dampen motion of the cable. The cable may comprise inner and outer tubes that are separated by a NNF. The inner tube may be filled with the same or different NNF, a Newtonian fluid or void. A magnetic field magnetic field may be applied to further control the viscosity of the NNF. The magnetic field may be controlled in response to a sensed condition of the cable indicative of shear stress in the NNF to provide either positive or negative feedback.

18 Claims, 10 Drawing Sheets

NON-NEWTONIAN FLUID (NNF) FILLED CABLE AND METHOD

BACKGROUND OF THE INVENTION

1. Field of the Invention

This invention relates to the design and control of cables in response to a wide range of energy input.

2. Description of the Related Art

Cables that are in tension exhibit vibration modes that can be energized by resonant energy input e.g. wind, tides, bumpy road conditions. The cables' mass/length, length, diameter and/or tension are suitably selected so that the cable does not vibrate (is "anti-resonant") over expected load conditions. Traditional multi-strand steel cables, ropes etc. exhibit a fairly narrow range of anti-resonance. If the load conditions vary outside this range, the cable may be energized and establish a vibrational mode(s). These modes can be very destructive. The Tacoma Narrows Bridge is a classic and infamous example of wind conditions energizing vibrational modes of the bridge that tore the bridge apart.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a composite cable and method that provides for control of the cable, and particularly its vibration modes, in response to a wide range of resonant and non-resonant energy input.

In an embodiment a cable comprises a non-Newtonian fluid (NNF) sealed within a cavity of a flexible tube. The NNF is characterized by viscosity that varies with shear stress. The cable subjected to a load applies shear stress to the NNF changing its viscosity to dampen motion of the cable. The cable may be formed as a multi-strand cable in which each strand comprises a NNF filled tube.

In an embodiment, the cable comprises inner and outer tubes that are separated by a NNF. The inner tube may be filled with the same or different NNF, a Newtonian fluid or void.

In an embodiment, a system for controlling the response of a cable to an applied load comprises a magnetic NNF (such as a Ferro fluid) sealed within a cavity of a flexible tube. The NNF is characterized by viscosity that varies with shear stress and magnetic field. A current source passes electrical current through one or more coils positioned around and spaced along the length of the cables. A sensor senses a condition of the cable indicative of shear stress as a measure of an applied load. A controller responsive to the sensed condition adjusts the electrical current applied to the coils to change the viscosity of the NNF and control the response of the cable to the applied load. The NNF filled cable naturally dampens the motion of the cable. The control may vary the magnetic field to further dampen the motion of the cable or alternately to excite motion of the cable. In an embodiment, the cable comprises inner and outer tubes that are separated by a NNF. The inner tube may be filled with the same or different NNF, a Newtonian fluid or void. Each tube may be provided with its own feedback loop to apply a magnetic field.

These and other features and advantages of the invention will be apparent to those skilled in the art from the following detailed description of preferred embodiments, taken together with the accompanying drawings, in which:

DETAILED DESCRIPTION OF THE INVENTION

A composite cable and method provides for control of the cable, and particularly its vibration modes, in response to a wide range of resonant and non-resonant energy input. The cable comprises a non-Newtonian fluid (NNF) sealed within a cavity of a flexible tube. The NNF is characterized by viscosity that varies with shear stress. A load on the cable applies shear stress to the NNF changing its viscosity to dampen motion of the cable. The cable may be a multi-strand cable in which each strand is a NNF filled tube. One or more cables may be formed into cable structures such as nets or rings. The cable may comprise inner and outer tubes that are separated by a NNF. The inner tube may be filled with the same or different NNF, a Newtonian fluid or void. A magnetic field magnetic field may be applied to further control the viscosity of the NNF. The magnetic field may be controlled in response to a sensed condition of the cable indicative of shear stress in the NNF.

Figure 1A:
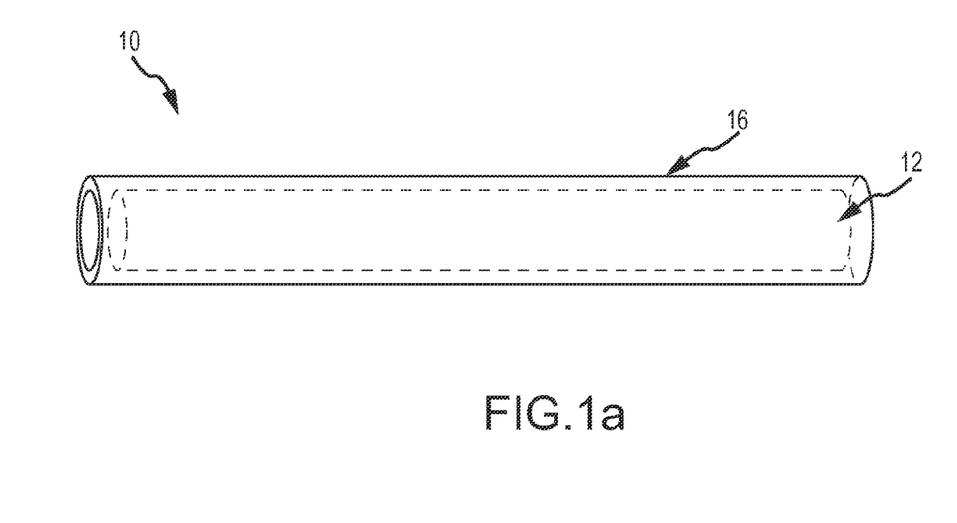
FIGS. 1a and 1b are perspective and end views of a NNF filled cable.
Figure 1B:
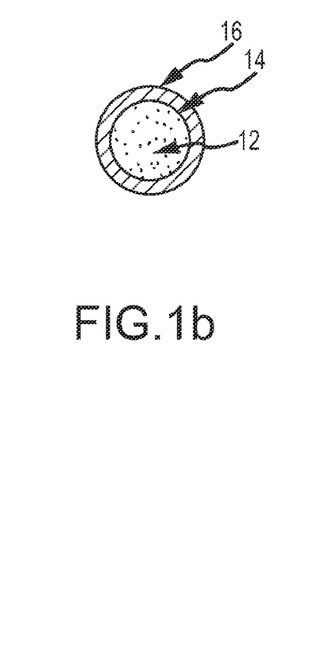

Referring to FIGS. 1a and 1b, a cable 10 comprises a non-Newtonian fluid (NNF) 12 sealed in a cavity 14 of a sealed flexible tube 16. In this embodiment, cavity 14 is axial symmetric about a long axis of tube 16. Tube 16 may, for example, be formed from plastic (e.g. Teflon, polyethelene, . . . ) tubes, rubber hose, surgical tubing, cloth with sealed pores, metal wires with hollow cores and hollow woven wire meshes (metal cloth) that surrounds more flexible material such as thin layers of rubber to seal the NNF inside the metal mesh but is sufficiently thin that it does not add to the mass/unit length. The cable may comprise a single NNF filled tube, multiple strands of NNF filled tubes, a network of interconnected tubes that share a reservoir of NNF or a single NNF filled tube in which the ends are connected to form a ring. Other cable structures may be envisioned in which one or more tubes are interconnected and either have their own NNF or share a common reservoir of NNF. The tube itself may exhibit vibration modes in response to energy input. These vibration modes are determined by the length, diameter, mass/length of the tube and tension applied to the tube. Alternately, the tube may effectively provide only a boundary (assuming the mass/unit length is mostly NNF) for the NNF so that the cable is responding as if composed entirely of NNF.

Figure 2:
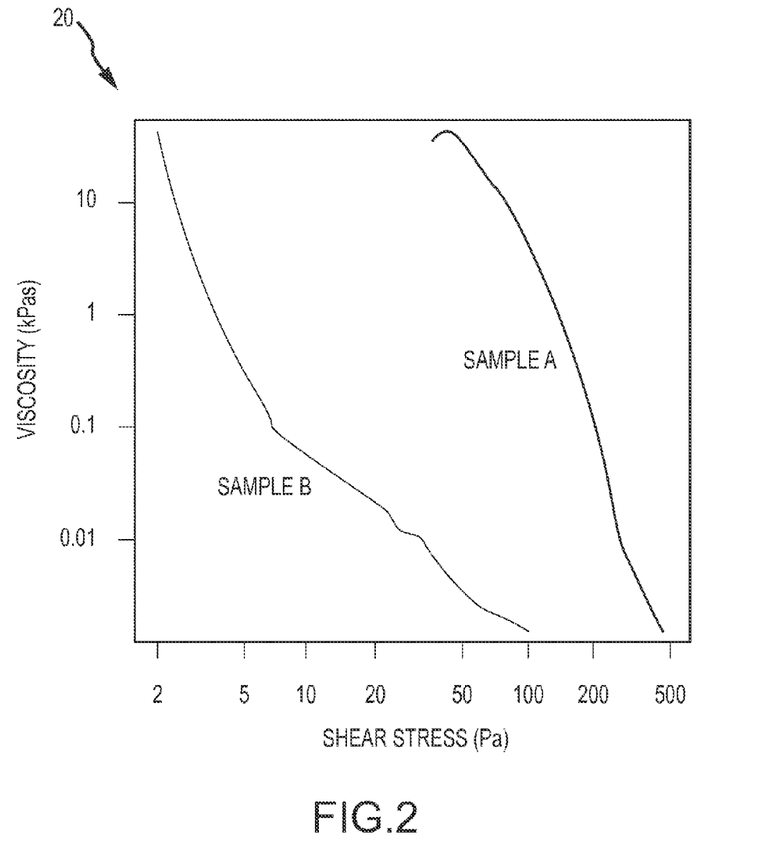
FIG. 2 is a plot of viscosity versus shear stress for exemplary NNFs.

Referring now to FIG. 2, a NNF is a fluid whose flow properties are not described by a single constant value of viscosity. Many polymer solutions and molten polymers are non-Newtonian fluids, as are many commonly found substances such as ketchup, starch-water suspensions, paint, blood and shampoo. In a Newtonian fluid, the relationship between the shear stress and the strain rate is linear with the constant of proportionality being the constant coefficient of viscosity. In a NNF, the relation between the shear stress and the strain rate is nonlinear. Therefore a constant coefficient of viscosity cannot be defined. As shown in FIG. 2, a shear-dependent viscosity 20 may be defined as a ratio between shear stress and rate of strain. As shown for two different sample materials (e.g. different magnetic inks), viscosity 20 decreases as the shear stress on the NNF increases. A more complete description of non-Newtonian fluids is provided in Norman J. Wagner et al. "Shear Thickening in Colloidal Dispersions" Physics Today, pp. 27-32, October 2009, the contents of which are hereby incorporated by reference.

Figure 3A:
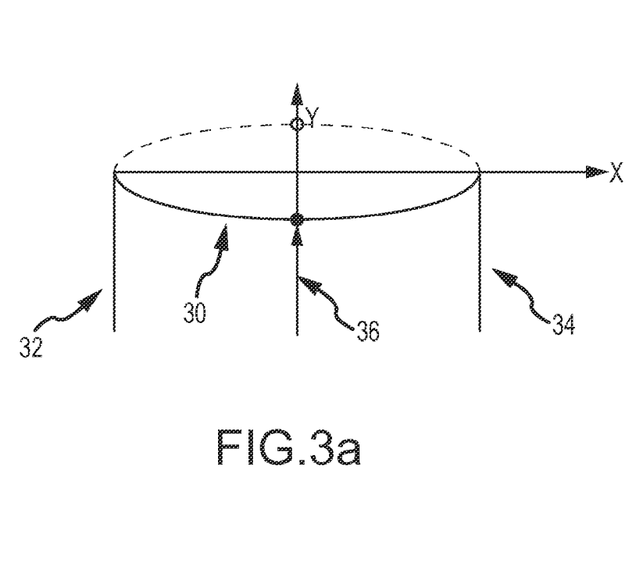
FIGS. 3a and 3b are a diagram and plot illustrating the response of Newtonian and NNF filled cables to an applied load.
Figure 3B:
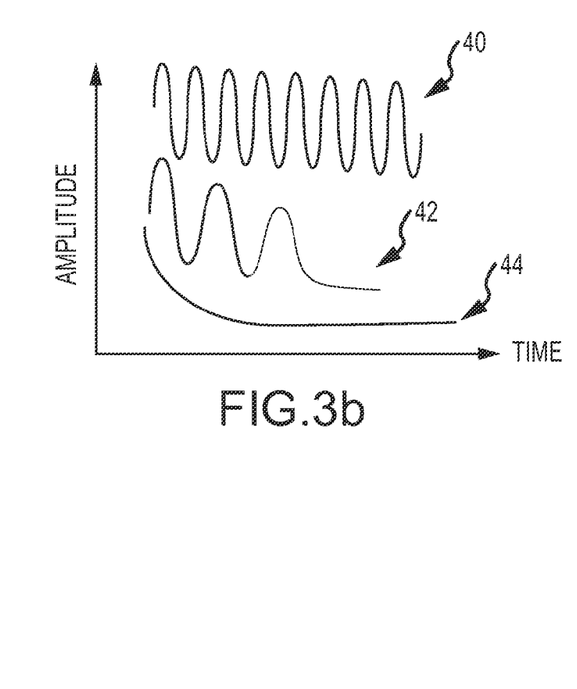

Referring now to FIGS. 3a and 3b, a cable 30 is connected under tension between posts 32 and 34 and an external energy input ("load") 36 is applied. The load may be a resonant energy input that establishes one or more vibration modes in the cable. This resonant energy input may be applied once or periodically. The load may be a non-resonant energy input that is applied randomly and out of sync with any vibration modes of the cable.

This load may, for example, be a resonant energy input similar to "plucking a guitar string" to establish a vibration mode. First consider cable 30 as formed from a Newtonian fluid in which the viscosity is constant. When the viscosity appears in the wave equation that describes the response of the cable as a constant, normal wave behavior for a cable is observed. Ignoring other losses, the cable follows a sinusoidal pattern 40 vibrating between minimum and maximum excursions. Now consider cable 30 as formed with a non-Newtonian fluid filled tube in which the velocity is variable with applied shear stress. The cable now follows a damped or over damped sinusoidal pattern 42 or 44, respectively, depending on the non-linear properties of the NNF. In essence, the NNF filled cable responds to the applied load and the resulting change in the shear stress of the NNF by changing its viscosity to dampen motion of the cable. The shear stress produces internal motion of the NNF, hence friction. Thus, the load energy is dissipated as thermal energy rather than kinetic energy in vibration of the cable.

Figure 4A:
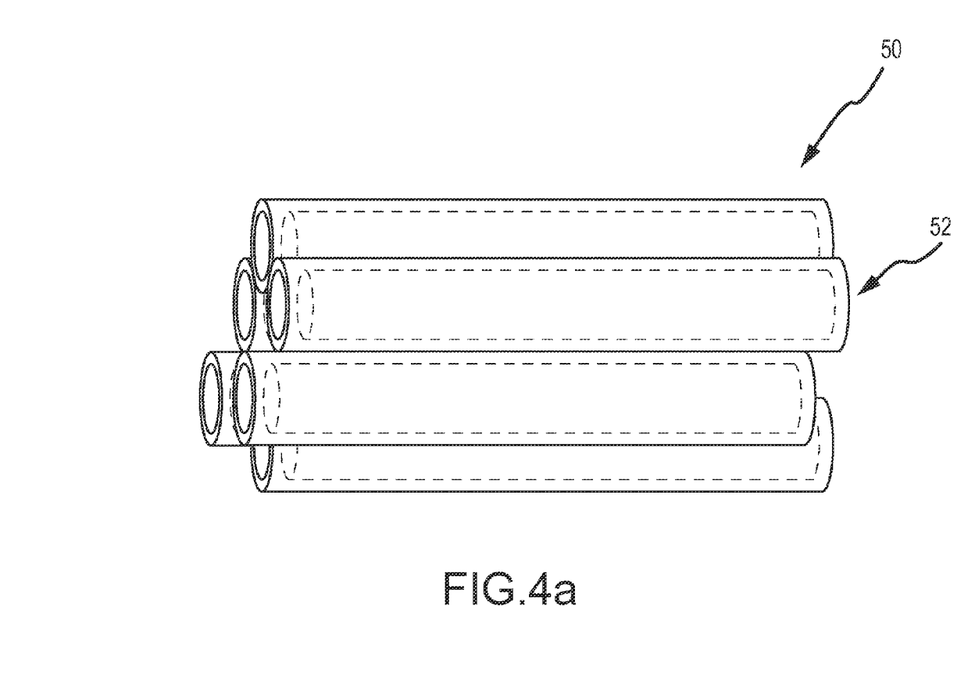
FIGS. 4a and 4b are perspective and end views of a multi-strand NNF filed cable.
Figure 4B:
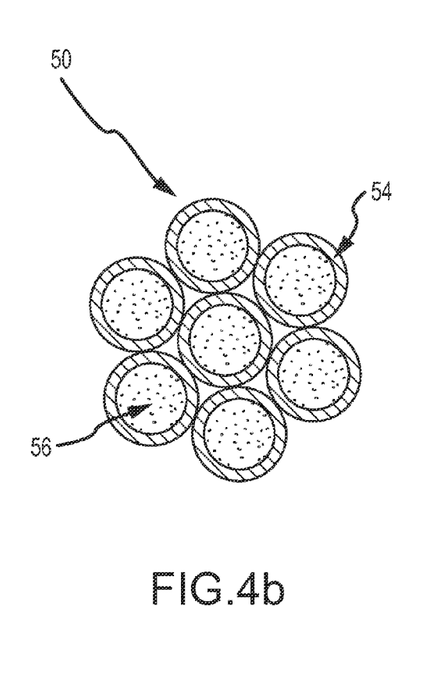

Referring now to FIGS. 4a and 4b, a multi-strand cable 50 comprises multiple cable strands 52 each comprising a sealed flexible tube 54 filled with NNF 56. The strands may be parallel as shown or twisted.

Figure 5A:
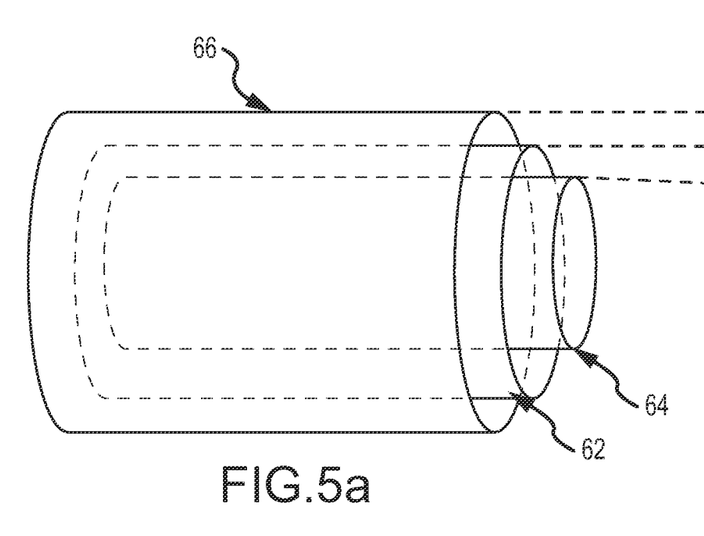
FIGS. 5a and 5b are perspective and end views of a NNF filed tube-within-a-tube cable.
Figure 5B:
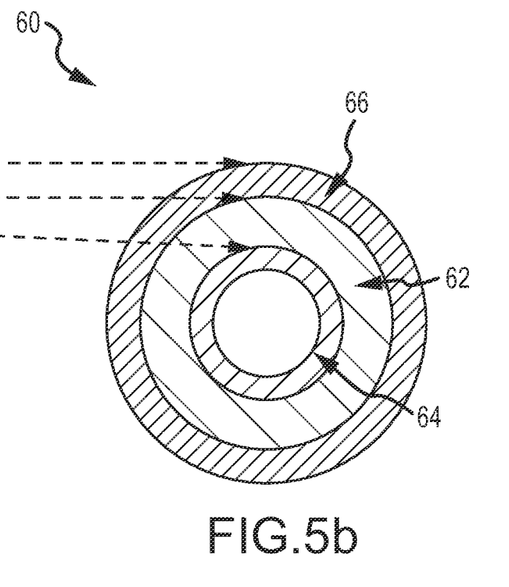

Referring now to FIGS. 5a and 5b, a cable 60 may comprise a "tube-within-a-tube" structure in which a NNF 62 is contained in the annular region between suitably concentric inner and outer flexible tubes 64 and 66. The inner axial symmetric cavity of inner tube 64 may be filled with the same or different NNF, may be left void or may be used to pass a Newtonian fluid. This use of different NNF in this structure may enhance the dampening capabilities of the cable.

Figure 6:
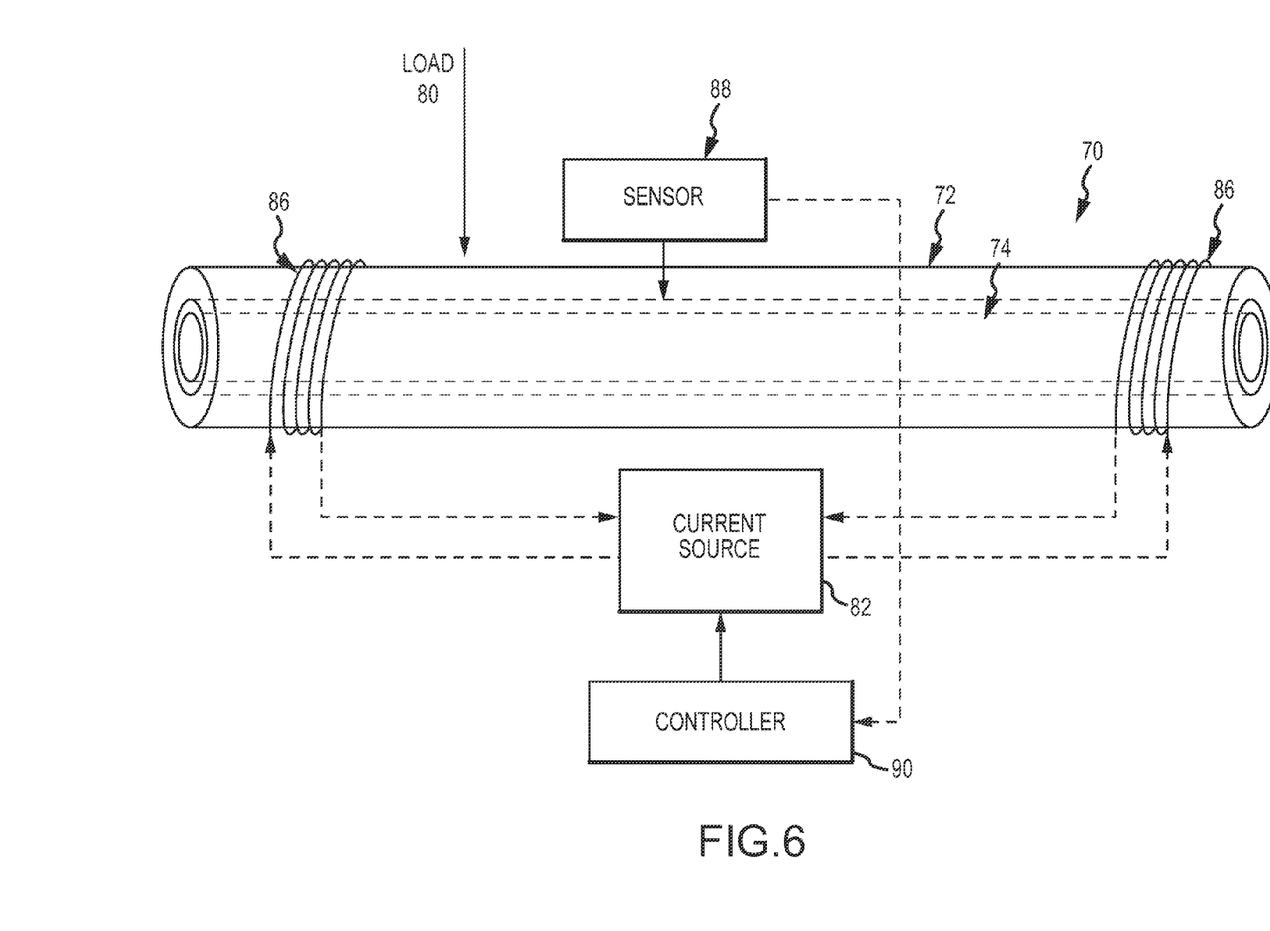
FIG. 6 is a diagram of a system for applying a magnetic field to a NNF filled cable to control its viscosity in response to an applied load.
Figure 7:
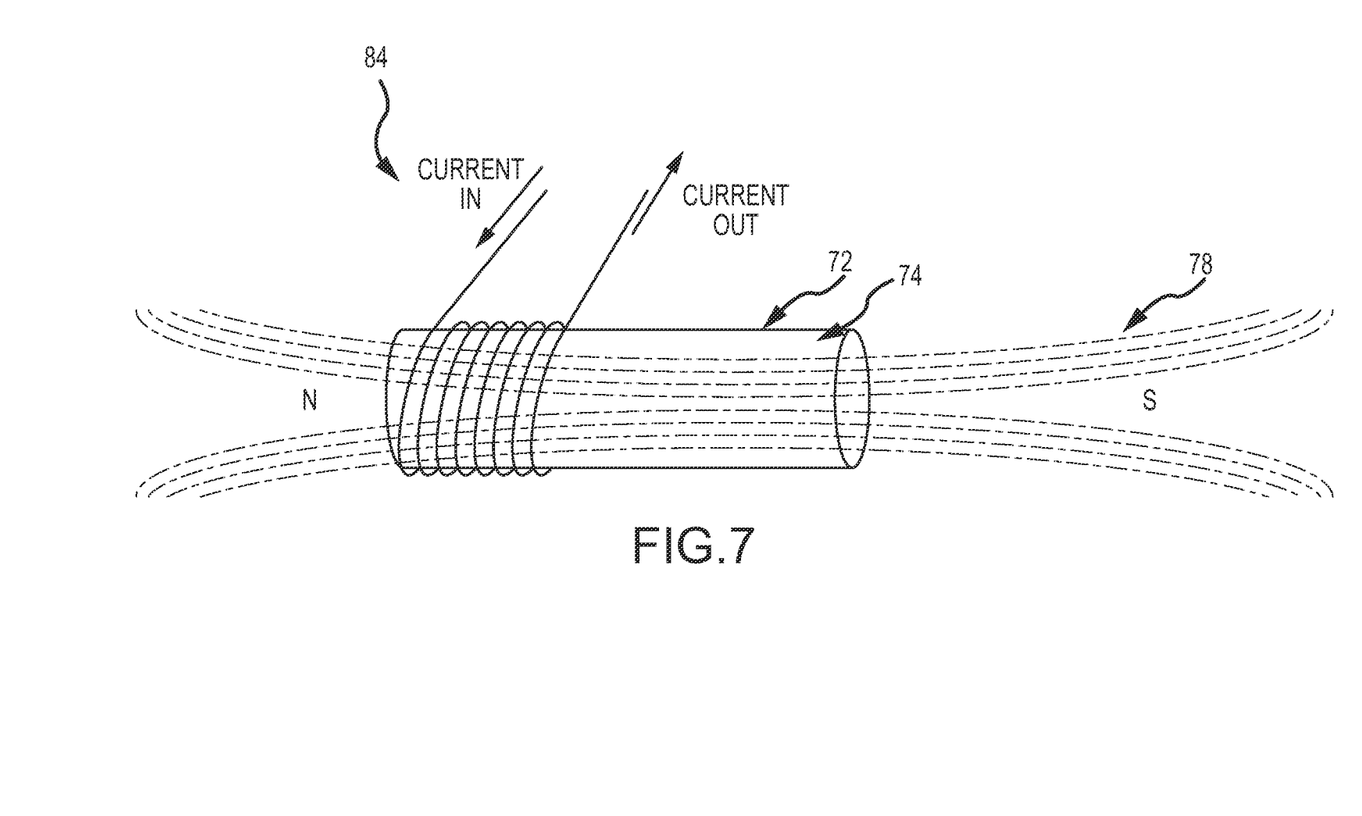
FIG. 7 is a diagram illustrating the magnetic field in the NNF filled cable.
Figure 8:
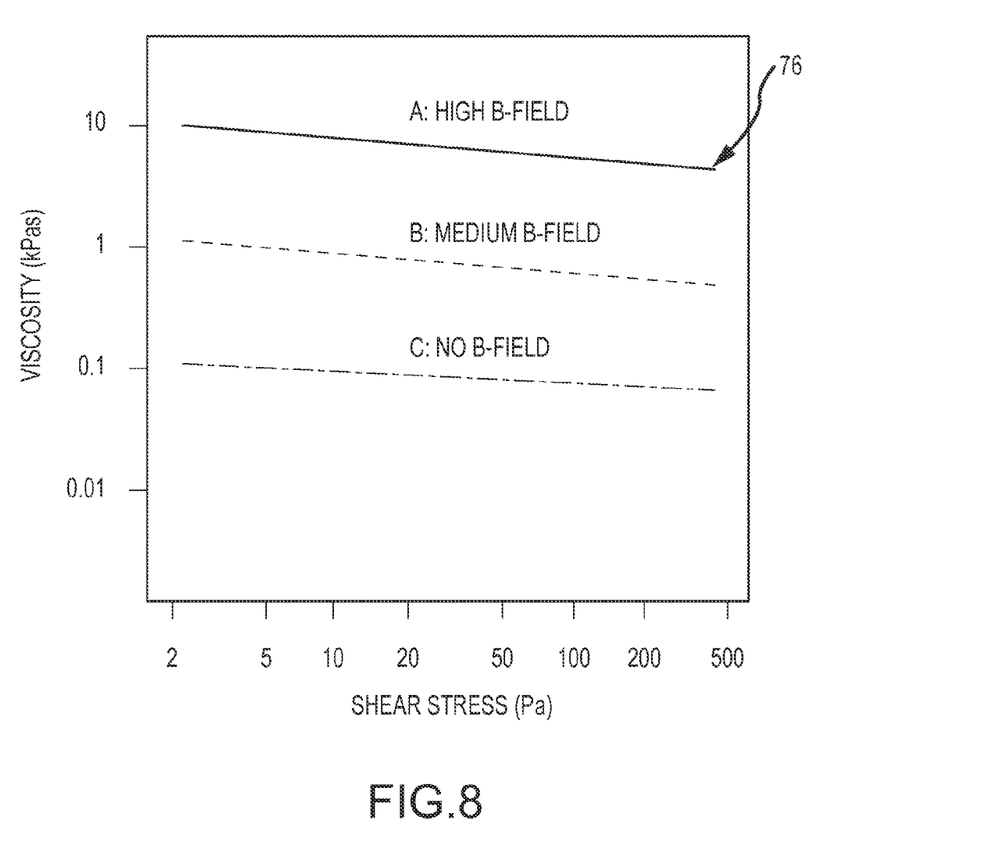
FIG. 8 is a plot of viscosity versus sheer stress under different applied magnetic fields.

Referring now to FIGS. 6-8, a cable 70 may comprise a flexible tube 72 filled with a magnetic NNF 74 in which the viscosity 76 is a function of both shear stress and a magnetic field 78 inside the cable. A Ferro fluid comprising ferrous nanoparticles suspended in oil is one example of a magnetic NNF. Cable 70 may comprise feedback, either negative or positive, to vary magnetic field 78 to vary viscosity 76 and control the response (motion) of the cable to an applied load 80.

A feedback system may comprise a current source 82 that supplies electrical current 84 to and through one or more coils 86 positioned around and spaced along the length of the cables. Even though a coil 86 may surround only a portion of the magnetic core (i.e. the magnetic NNF) the magnetic field 78 is established throughout the NNF. Additional energized coils 86 may be spaced along the length of the cable to reenergize the magnetic field.

A sensor 88 senses a condition of the cable indicative of shear stress in the NNF as a measure of an applied load. Sensor 88 may comprise one or more strain gauges attached to the tube itself Sensor 88 may comprise one or more accelerometers configured to measure the acceleration of the cable. Sensor 88 may comprise a video camera that captures the motion of the cable from which acceleration may be derived.

A controller 90 responsive to the sensed condition adjusts the electrical current 84 supplied to the coils to change the magnetic field in the NNF, hence the viscosity of the NNF to control the response of the cable to the applied load. The NNF filled cable naturally dampens the motion of the cable. The control may vary the magnetic field to further dampen the motion of the cable (negative feedback) or alternately to excite motion of the cable to, for example, sustain resonance (positive feedback). A resonant condition may also be achieved by passing current through the NNF as a baseline condition and then stopping current flow to induce vibrations.

Feedback may be applied to the "tube-within-a-tube" configuration of a NNF filled cable depicted in FIGS. 5a and 5b in which case each of the inner tube 64 and outer tube 66 is provided with its own feedback system (e.g. coils and sensors). The feedback may be controlled either independently or in coordination.

The described non-Newtonian fluid filled cable has many potential applications. For example, the NNF filled cable could be used as the arresting cable on-board aircraft carriers to stop planes during landing. The tube-within-a-tube structure could be used as an undersea pipeline to transfer Newtonian fluids such as natural gas, oil etc.

Figure 9:
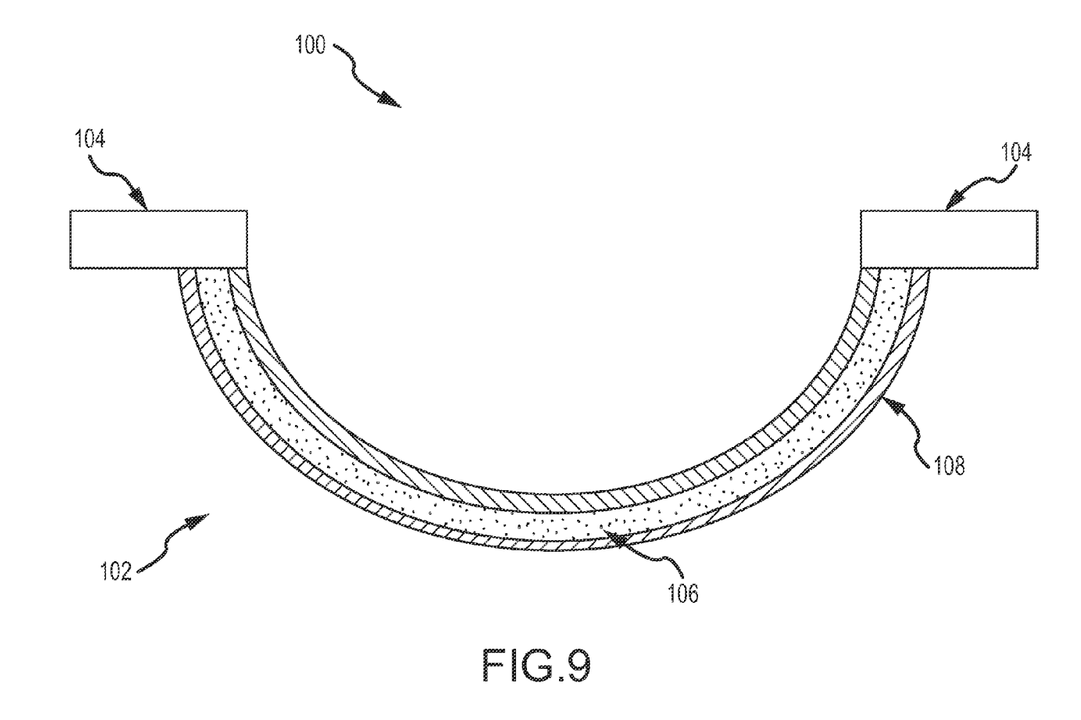
FIG. 9 is a diagram of a NNF filled cable providing dynamic support for a suspension bridge.

Referring now to FIG. 9, a portion of a suspension bridge 100 comprises a NNF filled cable 102 suspended between bridge abutments 104. When subjected to winds that might otherwise produce vibration modes such as those that destroyed the Tacoma Narrows Bridge the NNF 106 in the cavity of tube 108 responds to dampen the motion of the bridge and suppress the vibration modes.

Figure 10A:
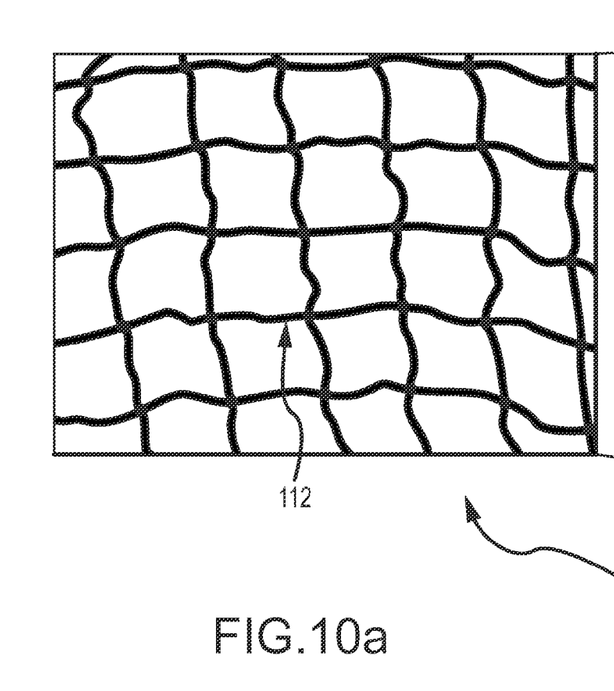
FIGS. 10a and 10b are plan and side views of a dynamic net formed from NNF filled cables responsive to changing load conditions.
Figure 10B:
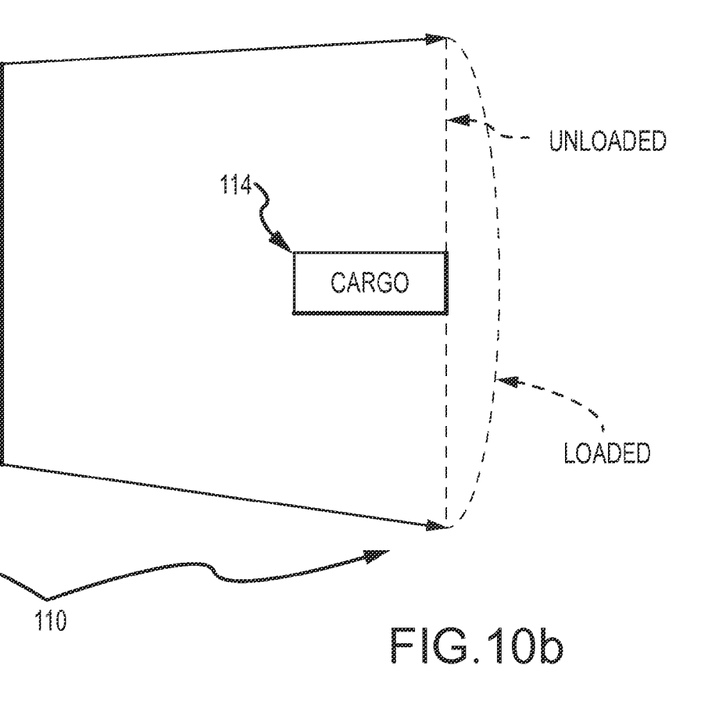

Referring now to FIGS. 10a and 10b, a dynamic cargo net 110 comprises a web of NNF filled cables 112. The net may be configured such that NNF is sealed within each segment of cable 112 or is sealed within a common reservoir defined by the entire net. Net 110 is placed over cargo 114 in the back of a vehicle or on-board a ship in a neutral tension state ("unloaded"). When the vehicle hits a bump or the ship rocks, cargo 114 shifts against the net putting it in tension ("loaded"). The tension produces shear stress on the NNF, which enables the non-linear effect on viscosity to dampen the motion of the cargo.

While several illustrative embodiments of the invention have been shown and described, numerous variations and alternate embodiments will occur to those skilled in the art.

Such variations and alternate embodiments are contemplated, and can be made without departing from the spirit and scope of the invention as defined in the appended claims.

We claim:

1. A passive cable, comprising:
   a flexible tube having an inner cavity that extends the length of the flexible tube; and
   a non-Newtonian fluid (NNF) that fills the-cavity, said NNF having a viscosity that increases with shear stress and without application of a magnetic field within the NNF,
   said passive cable subjected to a load that applies shear stress to the NNF increasing its viscosity to dampen motion and suppress vibration modes of the cable, said shear stress producing internal motion of the NNF, hence friction whereby load energy is dissipated in part as thermal energy rather than kinetic energy in vibration of the cable.

2. The cable of claim 1, wherein the NNF is confined between the tube and an inner tube that extends the length of the flexible tube.

3. The cable of claim 2, wherein the inner tube is filled with a different type of NNF.

4. The cable of claim 2, wherein the inner tube passes a Newtonian fluid.

5. The cable of claim 2, wherein the inner tube comprises only a NNF, a Newtonian fluid or is void.

6. The cable of claim 1, wherein no magnetic field is applied to vary the viscosity of the NNF and control the motion of the cable.

7. The cable of claim 1, wherein the NNF is a shear-thickening NNF.

8. A method of passive dampening of motion of a cable, comprising:
   providing a cable comprising non-Newtonian fluid (NNF) sealed in an inner cavity that extends the length of a flexible tube, said NNF having viscosity that increases with shear stress without application of a magnetic field within the NNF,
   applying a load to the cable that subjects the NNF to shear stress; and
   in response to the shear stress and without applying a magnetic field to the NNF, increasing the viscosity of the NNF to dampen motion and suppress vibration modes of the cable, said shear stress producing internal motion of the NNF, hence friction whereby load energy is dissipated in part as thermal energy rather than kinetic energy in vibration of the cable.

9. The method of claim 8, further comprising dissipating the load energy in part as thermal energy due to internal motion of the NNF.

10. The method of claim 8, wherein the NNF is confined between the tube and an inner tube that extends the length of the flexible tube.

11. The method of claim 10, further comprising filling the inner tube with a different type of NNF.

12. The method of claim 10, further comprising passing a Newtonian fluid through the inner tube.

13. A cable, comprising:
   a cable comprising a magnetic non-Newtonian fluid (NNF) inside a cavity of a flexible tube, said NNF having viscosity that varies with both shear stress and magnetic field, said NNF filled cable increasing viscosity with shear stress to naturally dampen the motion of the cable due to shear stress;
   one or more coils positioned around the cable and spaced along the length of the cable;
   a current source that supplies electrical current to the coils to produce a magnetic field within the NNF;
   a sensor that senses a condition of the cable indicative of shear stress in the NNF as a measure of an applied load; and
   a controller responsive to the sensed condition to adjust the electrical current applied to the coils to vary the magnetic field and change the viscosity of the NNF, said controller either varying the magnetic field to provide negative feedback to further dampen the motion of the cable or to provide positive feedback to excite motion of the cable.

14. The cable of claim 13, wherein the NNF is a Ferro fluid that comprises nanoparticles suspended in an oil.

15. The cable of claim 13, wherein the controller provides negative feedback to enhance the dampening of motion of the cable.

16. The cable of claim 13, wherein the controller provides positive feedback to sustain motion of the cable.

17. The cable of claim 13, wherein the inner tube is filled with a different inner NNF, further comprising:
   one or more inner coils positioned around the inner tube and spaced along the length of the inner tube;
   a current source that supplies electrical current to the inner coils to produce a magnetic field within the inner NNF;
   a sensor that senses a condition of the NNF inside the inner tube indicative of shear stress as a measure of the applied load; and
   a controller responsive to the sensed condition to adjust the electrical current applied to the inner coils and change the viscosity of the inner NNF.

18. The cable of claim 13, wherein the NNF is a shear-thickening NNF in its natural state.

* * * * *

UNITED STATES PATENT AND TRADEMARK OFFICE
CERTIFICATE OF CORRECTION

| | | |
|---|---|---|
| PATENT NO. | : 8,499,908 B2 | Page 1 of 1 |
| APPLICATION NO. | : 13/091840 | |
| DATED | : August 6, 2013 | |
| INVENTOR(S) | : Barker et al. | |

It is certified that error appears in the above-identified patent and that said Letters Patent is hereby corrected as shown below:

In the Claims:

In column 6, claim 13, line 12, delete "filled cable increasing" and insert --increasing-- after "viscosity"

Signed and Sealed this
Seventeenth Day of September, 2013

Teresa Stanek Rea
*Deputy Director of the United States Patent and TrademarkOffice*